INVENTOR.
*Farhad Sazegar*

Oct. 4, 1966 F. SAZEGAR 3,276,440
INCLOSED BARBECUE UNIT
Filed Aug. 20, 1965 3 Sheets-Sheet 2
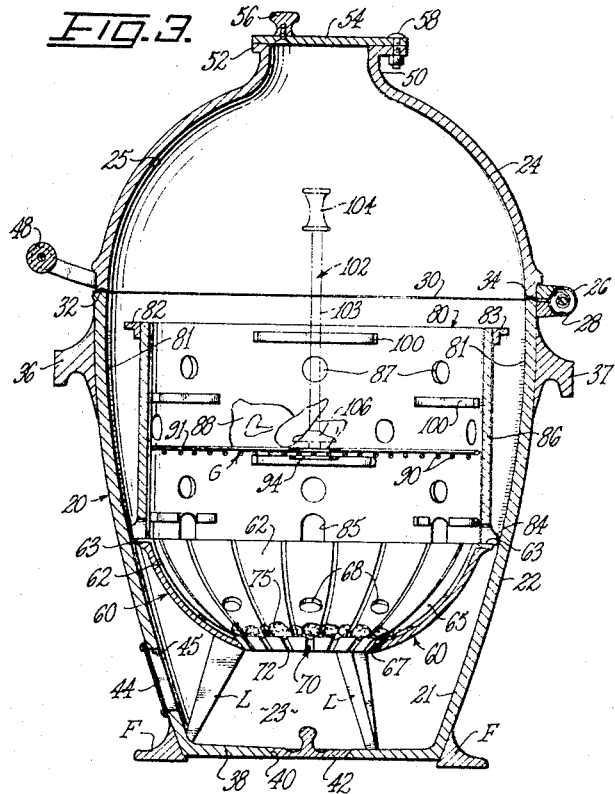
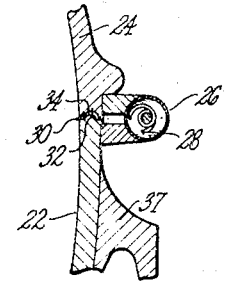
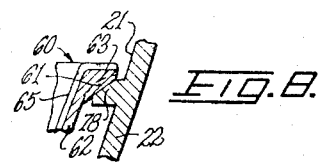
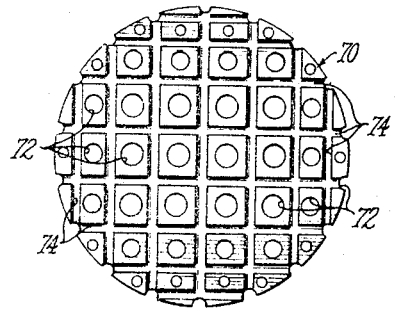
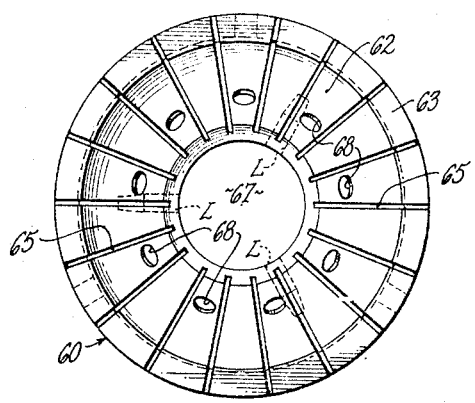
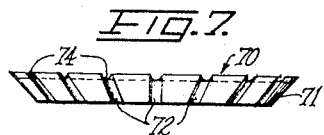
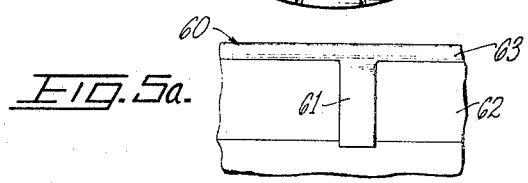
INVENTOR.
FARHAD SAZEGAR
BY
Howard L. Johnson
ATTORNEY Oct. 4, 1966 F. SAZEGAR 3,276,440
INCLOSED BARBECUE UNIT
Filed Aug. 20, 1965 3 Sheets-Sheet 3
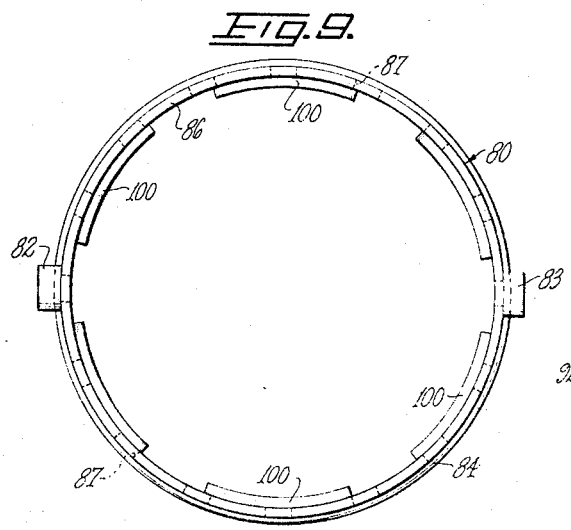
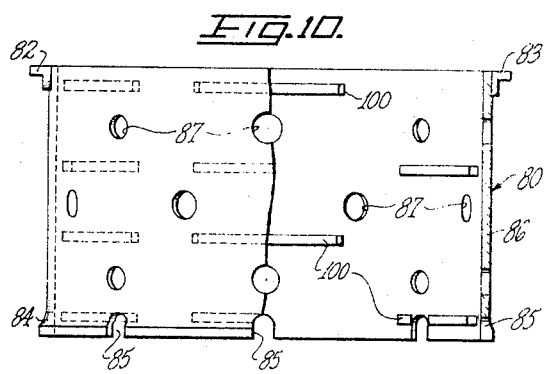
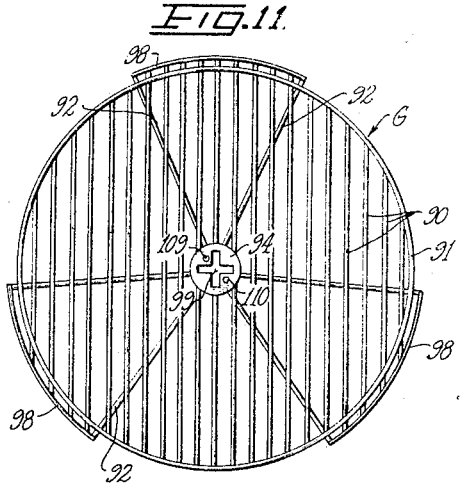
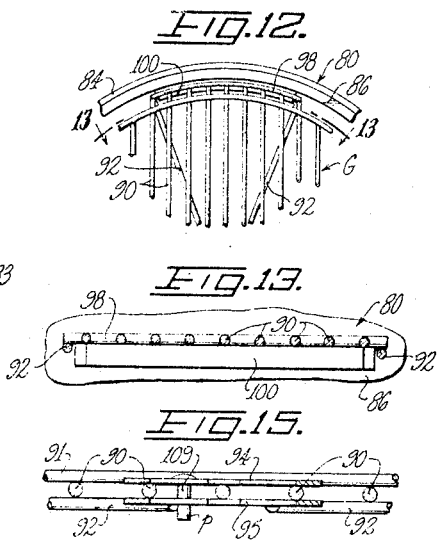
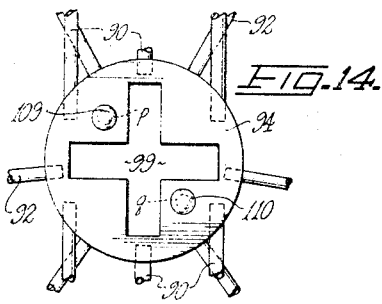
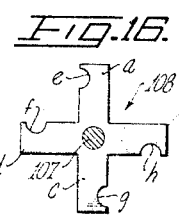
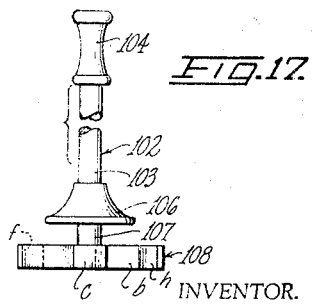
INVENTOR.
FARHAD SAZEGAR
BY
*Howard L. Johnson*
ATTORNEY

United States Patent Office 3,276,440
Patented Oct. 4, 1966

3,276,440
INCLOSED BARBECUE UNIT
Farhad Sazegar, 15413 Cordary Ave., Lawndale, Calif.
Filed Aug. 20, 1965, Ser. No. 486,255
6 Claims. (Cl. 126—25)

This is a continuation-in-part of my application Serial Number 314,756, filed October 8, 1963 now abandoned.

This invention relates to a cooking unit of the general type commonly exemplified by an (outdoor) barbecue grill, but which now can additionally (1) be shifted at will between indoor and outdoor use due to its substantially inclosed construction; (2) can be completely shut up (after initial cooking) so as to long retain heat in the cooked food, as well as subsequently to exclude dust and rain during periods of non-use or storage; and (3) can be easily adjusted during use to obtain a more efficient use of fuel and a more effective preparation of the food cooked therein, so that food is fairly uniformly cooked at its initial location without requiring turning or shifting as with the turning spit of a rotisserie.

The invention provides an outer housing (typically of decorative shape and/or ornamentation similar to a large urn such as is frequently observed in a patio or loggia), the housing having a top cover of sufficient size that the principal internal elements such as grate and grill may be readily lifted out (for cleaning or replacement) and the interior of the housing then simply washed down with a hose or scoured with a brush and detergent if desired. Since such an object is a decorative article in itself, it can be left standing at any location during a season of non-use, without danger of offending aesthetically or without damage to itself from weather.

Another object is to provide such an essentially urn-simulating or "barrel-shaped" tubular housing, functionally equipped with a peripherally inclosed, transverse cooking zone intermediate is height, the surrounding walls and internally concave cover of which zone are disposed to focus or concentrate reflected heat back onto the food located on the grill so as to obtain a greater thermal efficiency and uniform cooking. The inwardly concave, annular reflecting wall of the zone, as well as the domed cover, advantageously is formed of glazed ceramic, or alternatively of polished metal. However, the whole upstanding tubular housing can be formed of ceramic material, and externally shaped and decorated like an object d'art.

Additional advantages are obtained by the provision of a separable (two part) removable grate or fuel holder, as well as a removable cooking cage which has means for locating the food-supporting grill at selected heights or vertically separated levels, all of which elements can be gravitationally placed (and removed) from the top of the housing to form a vertical stack therein with the elements automatically falling in functional position (when inserted in the correct sequence). Such result is obtained without employing special coupling or attachment means, and without complicated manipulation. Any one or more of such stacked elements is easily replaced if damaged, and any or all can be removed for cleaning simply by lifting them out of the opened top.

The invention also provides a simple and highly effective means for selectively disposing the food-supporting grill at different levels within the open-ended cage of the cooking zone, thus permitting adjustment for the size of the food and its desired cooking time (or speed), as well as to balance such varying features as height of the flame, characteristics of a particular fuel, etc. Or again, food can be cooked primarily at the lowermost (hottest) level, and then raised to an upper level merely to be kept hot for a prolonged period of time by use of a lower or dying fire or even with the housing then completely closed so that the fire necessarily becomes extinguished, but without appreciable dissipation of confined heat.

Still another advantage of the present construction arises from its adjustable means for restricted or controlled passage of air up through the housing by which a relatively high humidity is maintained therein (even when such moisture is initially supplied by the body of food). Accordingly, the meat or other food does not become dried out as when cooked over an open fire, and it is not essential to add liquid to it continually during cooking, as with an open-topped container on a stove.

Further, the essentially complete inclosure provided by the housing shell prevents the food from being contaminated by blowing dust, ashes, or rain as often happens with open barbecues, and at the same time it prevents sparks or ashes from being spread from the cooking fire, as well as eliminating the possibility of children or pets falling into the fire or food. Likewise, the chances of a sudden shower extinguishing the flame, as well as the possibility of dripping fat suddenly causing it to flare out of control, is completely abolished.

Thus, regardless of cause, it is virtually impossible for the fire to spread outside of the present housing shell. Accordingly, it is much safer to use highly combustable liquid fuel to start such a fire in the unit. For the same reason, one can leave the fuel container full of burning material without fear of combustion spreading to the environs during one's absence, whether the air vents are left open or closed. Stated another way, it is not necessary to douse the coals with water (resulting in smoke) before leaving it, as is the case with an open barbecue.

Additional objects and advantages will become apparent as the description proceeds, having particular reference to the accompanying drawings which illustrate a presently preferred embodiment of the invention, wherein:

FIGURE 3 is a vertical axial sectional view through the unit with a fowl shown resting on the grill within the cooking cage, and the operating spindle shown in phantom lines;

FIGURE 4 is a fragmentary vertical section particularly showing the hinge construction;

FIGURE 5 is a top plan view of the fuel holder alone, with the central grate removed;

FIGURE 5a is a fragmental view looking horizontally at the outer face of the fuel holder rim, showing the spacing lug thereon;

FIGURE 6 is a top plan view of the central grate by itself;

FIGURE 7 is an edge elevational view thereof;

FIGURE 8 is a fragmental vertical section of a modified housing which is adapted to support therein a fuel holder which lacks legs;

FIGURE 9 is a top plan view of the grill-holding cooking cage by itself, with the grill removed;

FIGURE 10 is a side elevational view of the cage with the right half removed to show the internal construction;

FIGURE 11 is a top plan view of the grill alone;

FIGURE 12 is an enlarged, fragmentary top plan view of a portion of the grill and cage, showing an inner shoulder of the cage providing edge support for the grill;

FIGURE 13 is a vertical section through the shoulder taken along the arcuate line 13—13 of FIGURE 12;

FIGURE 14 is a top plan and FIGURE 15 is a vertical section of the central portion of the grill, showing the attachment plates; and FIGURES 16 and 17 are bottom plan and side elevational views respectively of the operating spindle used to raise and lower the grill betwen different support levels of the cooking cage.

Figure 1:
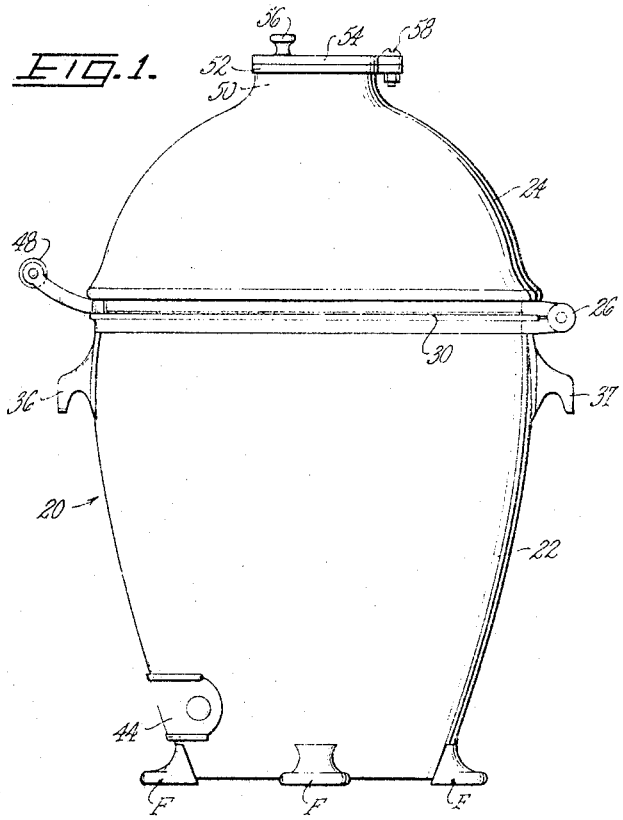
FIGURE 1 is a side elevational view of my new inclosed barbecue unit.
Figure 2:
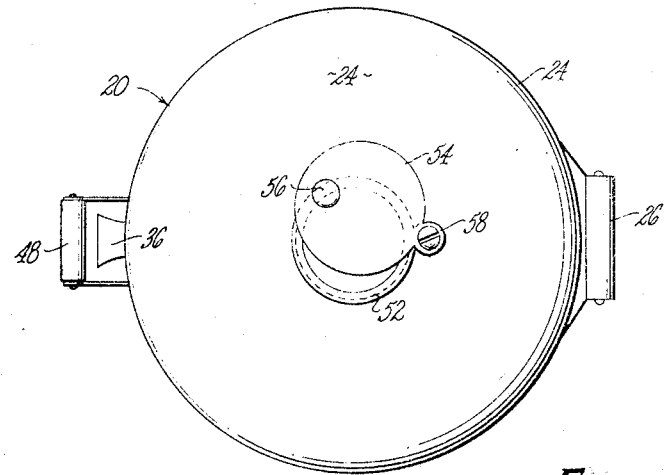
FIGURE 2 is a top plan view thereof, showing the top vapor outlet partially open.

In the embodiment of the invention here particularly illustrated, there is provided a housing shell or tubular casing 20 (FIGS. 1-3) which, except for such added items as small doors, hinges, handles, etc., can be molded entirely of ceramic material in two matable parts consisting of a lower body 22 and a complementary, upper, dome-shaped cover or closure 24, which parts are then coupled together by a generally horizontally disposed, edge hinge 26. The latter may be constructed with a torsion spring 28 disposed to hold it open or upright after having been swung to a more-or-less vertical position by hand. When shut, the weight of the cover 24 without added clamping means is generally sufficient to hold it in sealing registration with an annular asbestos gasket 30, which overlies the top edge of the body 22. The heat-resistant gasket 30 is longitudinally furrowed to form an upward bow which conformingly overlies a central, upstanding rib 32 (FIG. 4) extending lengthwise along the top edge of the body 22, which rib, together with the gasket, is snugly received in the corresponding groove 34 of the downswung cover 24.

The lower body 22 may be provided with an opposing pair of handles 36, 37, projecting laterally outward adjacent its upper edge, as well as a plurality of dependent footing members F, supportingly projecting from and spaced about a generally flat bottom 38. The latter is centrally apertured to provide an ash outlet 40 which is normally filled by a plug closure 42 insertable from the interior of chamber 23 of the body. Near the bottom, an arcuate-shaped, horizontally slidable door 44, correspondingly shaped to the body curvature of the housing 22 at that level, externally overlies a corresponding lateral opening 45 of the body, so that by its selected lengthwise displacement it may provide an air inlet of variable capacity into the chamber 23.

The hinged cover 24 is provided with a laterally projecting handle 48 located diametrically opposite the hinge 26. Near the apex of the dome, the cover is shaped to form a squat stack or outlet neck 50, terminally carrying an external band 52 to which is clamped a horizontally-slidable, damper plate 54, provided with a hand knob 56, by means of which it is manually swingable about the vertical pivot pin 58. By such adjustment of the damper 54, the flow of smoke and air of the chamber 23 can be controlled or completely shut off, and at the same time the pattern is established for cyclic circulation of heated air within the shell. After the fire is started, the damper may be opened to a cross-sectional area less than the inlet area provided by the lower sliding door 44. Often the damper opening may be set at just enough space to pass a match stem, so that a small stream of fresh air continues to be drawn through the bottom inlet 44. Accordingly, the greater mass of heated air which is rising within the unit is deflected back, lengthwise along the side walls in a continuous cycle. At the same time, the inner curvature of the reflective (i.e. glazed ceramic) dome or cover 24 focuses radiant heat on the horizontal area of the cooking zone 81 beneath it, so that the food is cooked substantially uniformly from all directions. Further, any small column of smoke and vapour thus emitted from the constricted throat 50 (above which a flue—not shown—can be located when the unit is used indoors) is funneled more-or-less vertically, with a directed updraft which lifts it above the heads of persons gathered thereabout before it starts to spread out laterally in response to atmospheric currents; this is in marked contrast to most outdoor barbecues.

It will be observed that the cover 24 bisects the tubular housing 20 at or near a level of its maximum circumference, so that upon the cover being opened, objects (including food, such as a large roast) which in size approximate the internal periphery of the lower body 22, can readily be inserted and removed therethrough. In addition, the interior (of both parts 22 and 24 of the shell) are easily accessible to be hand scrubbed or washed down with a water hose when required.

Within the body 22 there is placed a fuel-holding unit 60 having an upper, bowl-shaped portion 62 bounded by an out-turned peripheral rim 63 which is disposed to locate itself adjacent the inner tubular wall 21 of the shell when its dependent legs L (here three in number) rest on the bottom 38. The upper face of the bowl 62 is formed with a radiating series of upwardly projecting ribs 65, laterally spaced apart and extending from the rim 63 downward to a central aperture 67. The space between successive ribs is traversed by one or more air passages 68. A disk-shaped grate 70 having a beveled periphery 71, transverse air openings 72, and an upper grid of open-top grooves 74 may be removably located in the aperture 67 (or the bowl and grate can be formed integrally). Accordingly, one or more layers of charcoal or briquettes 75 can be burned directly atop the grate 70 and/or larger pieces of fuel such as wood, rolled newspapers, etc., burned in the upper bowl portion. In this connection, after cooking is completed, shutting both the lower door 44 and damper 54 causes the fire to go out from lack of oxygen (preserving unburned fuel for subsequent use) while retaining the inclosed food warm for a considerable period.

For use of fuel holders 60 which lack the present legs L, the inner wall 21 of the housing body (FIG. 8) may be formed with an inner, annular, interrupted ring 78 of arcuate segments which directly support the bowl rim 63 so as to locate the burning zone at the desired level above the bottom 38 within the chamber 23. Inasmuch as the diameter of the rim 63 is less than that of the housing body at the level of interrupted ring 78, as shown in FIG. 8, the openings between the arcuate segments permit passage of air above and below the bowl 62 along the inner wall 21 of the housing. Particularly for use when the annular, inner support ring 78 is continuous instead of interrupted, such a (usually legless) bowl 62 is formed with an outer peripheral series (e.g., 3 in number—FIG. 5) of lugs 61 which seat against the ledge 78 (FIG. 8) to ensure the presence of a permanent up-down air passage between the bowl edge and the inner casing wall.

Upon the inner face of the fuel-holder's rim 63 there is removably supported a generally cylindrical, open-ended cage 80 having an opposing pair of upper, externally projecting ears 82, 83 which serve as handholds for lifting the cage in and out of the shell 22. A lower, laterally thickened, reinforcing band 84 is intermittently scalloped at 85 to permit cross-passage of air. The upstanding, cylindrical side wall 86 may be either substantially solid or substantially open, as desired, but is here illustrated with a number of transverse apertures 87 which serve to equalize the heat on opposite sides of the cage 80. The location of the cooking cage 80 within the outer shell or casing 20 corresponds roughly to a truncated band or area, generally referred to at 81 (FIG. 3), across the upstanding housing tube 20; this cooking zone is supplied with heat, primarily, rising from the burning zone of the fuel holder 60, and secondarily, reflected from the adjacent lateral walls 21 of the casing, and also focussed downward from the inner concave surface 25 of the domed cover 24. To accentuate this effect, the inner surface of the ceramic casing may advantageously be glazed, or the interior of the shell 20 may be formed of polished metal, as noted earlier. Thus the flow of heat generated in the lower burning zone does not simply rush past the overlying cooking food and then disappear into the atmosphere as is the case with an open barbecue.

Depending upon the quantity and nature of the food 88 to be cooked, as well as the character and quantity of the fuel 75 (e.g. the height of the flame produced) it is often desired to place the food at different heights or levels in the cooking zone; or again, first to cook it faster at a lower level and then to move it up to an upper level to maintain it warm for a prolonged period with only a low fire (or with the casing completely shut up and the flame then allowed to die). Accordingly, there is provided a food-holding grill G (FIG. 11) formed by parallel rods 90 anchored within an annular rim 91 upon which the food may be laid. Means are provided for locating the grill at selected cooking levels within the cage 80. These include a frictionally underlying frame formed of light tubing or angularly directed rods 92 extending radially outward from a central anchorage beneath a parallel pair of axial attachment plates 94, 95 (FIG. 15) which sandwich the main rods of the grill. Adjacent arms 92 of the underframe are brought together just beyond the outer periphery of the annular rim 91 after being turned up to form an arcuate segment or engaging means 98 which is shaped to frictionally overlie an inward-projecting arcuate shoulder 100 (FIG. 12) located horizontally along the inner wall 86 of the cage. There are several, vertically separated, broken rings, or levels of such shoulders 100; the number of shoulders (here three) in each ring corresponding to the number of frame segments 98 of the grill.

When the segments 98 are turned (by rotating the girll G) so as to lie intermediate the shoulders 100 of a particular ring, the grill can then be moved axially (up or down) within the cylinder 80, that is, to remove it completely or to shift it from one level to another. The shoulders of successive rings are circumferentially staggered, so that rotating the grill sufficiently to remove the projecting segments 98 from one ring of shoulders will turn the segments to a position where they can be dropped gravitationally onto the shoulders of the ring beneath.

For moving the grill G from one level of shoulders 100 to another (as well as for inserting and removing it from the cage 80), there is provided a detachable operating spindle 102 (FIG. 17) having an upper, terminal handhold 104 by which one may manipulate the mounted grill by reaching beneath the opened cover dome 24. At the lower end of a relatively thin shaft 103 is a horizontally flared, axially tapered, annular hub 106 having a generally flat bottom and a periphery some what less than that of the central grill plate 94 which it is intended to abut (in use). Spaced axially below the hub by a stub shaft 107 is a perpendicularly extending, cruciform structure 108 formed of four radially projecting arms $a, b, c, d$ (FIG. 16), which are jointly insertable through a corresponding socket opening 99 in the attachment plates 94, 95. The latter plates which embrace opposite faces of the grill rods 90, are fastened together by a diametric pair of vertical rivets or pins 109, 110, which project below the face of the lower plate (FIG. 15). The pair of crossed arms $a$–$c$ and $b$–$d$ are each notched along opposite longitudinal edges, so that upon rotating the spindle 102 in one direction (clockwise, looking down) the notches $f, h$ first engage the bottom projections $p, q$ and then turn the whole grill G in that direction; rotation of the spindle 102 in the opposite direction (counterclockwise) causes the notches $e, g$ to abut the other side of the $p, q$ and rotate the grill in that direction.

From the foregoing, the construction and operation of the depicted device will be readily understood and further explanation is believed to be unnecessary. However, since numerous modifications and changes will occur to those skilled in the art, it is not desired to limit the concept to the exact construction shown and described, and accordingly all suitable modifications and equivalents may be resorted to, falling within the scope of the invention as hereafter claimed.

I claim:

1. A cooking assembly of the character described, comprising in combination:

an upstanding, generally tubular, closed-end housing, internally having a generally annular band of heat-reflecting material surrounding an intermediate-height, transverse cooking zone, which includes food support means, the housing having adjustable air-inlet means below said zone and separately adjustable damper means above the zone, said housing including an upper closure spanning a transverse aperture which approximates the inner periphery of said zone, whereby an article of a size adapted generally to fill said zone may be inserted and removed through said aperture, said housing being thus adapted to provide a substantially sealed, heat-retaining inclosure upon shutting the air-inlet means, the damper means and said closure;

a grate unit removably disposed transversely within the housing beneath said cooking zone and spaced above said air inlet means and above the bottom of said housing, said unit comprising a central grid and a peripherally surrounding dished portion characterized by upstanding, generally radially directed ribs and laterally separated upward-directed air passages through said portion;

a generally cylindrical, open-ended, tubular cage, removably disposed within said cooking zone and bearing about its inner face successive axially spaced, interrupted circles of inward-projecting arcuate supports, the supports which comprise each interrupted circle being circumferentially staggered relative to those of axially adjacent circles;

a generally annular, transversely disposed grill movable axially within the cylindrical cage and within its circles of projecting supports, and adapted to hold food for cooking at different support levels provided by said interrupted circles, said grill being formed with a central, top-opening, spoke-shaped socket and having engaging means disposed about its periphery and adapted individually to overlie said arcuate supports of successive interrupted circles; and means for rotating said engaging means to and from circumferential alignment with the arcuate supports of each circle whereby the grill may be axially moved from one circle to another to change its elevation within the cooking zone and also lifted in and out of said cage and housing, said rotating means comprising a detachable operating spindle formed with radially extending arms adjacent one end thereof, which arms are receivable in rotary driving relation within the central socket of said grill.

2. The assembly of the preceding claim 1 wherein said housing is formed essentially of ceramic material, the interior of which is glazed at least to the extent of forming said heat-reflecting band.

3. A cooking assembly of the character described, comprising in combination:

an upstanding, generally tubular, closed-end housing having means for regulating upward flow of external air therethrough and being adapted to provide a substantially sealed, heat-retaining enclosure characterized by an intermediate-height, generally transverse cooking zone including associated support means;

a grate unit disposed within each said housing beneath the cooking zone;

a generally cylindrical, open-ended tubular cage retained by said support means within said cooking zone and bearing about its inner face successive axially spaced, interrupted circles of inward-directed arcuate supports, the supports which comprise each interrupted circle being circumferentially staggered relative to those of axially adjacent circles;

a generally annular, transversely disposed grill movable axially within the cylindrical cage and adapted to hold food for cooking at different support levels provided by said interrupted circles of arcuate supports, said grill having a peripheral series of elements adapted at selected positions of rotation of the grill to engage said arcuate supports of such circles; and operative means for engaging and disengaging the respective arcuate supports and engaging elements, and for moving the grill from one support level to another within said cage.

4. In combination with the housing of a cooking assembly of the character described, including fuel retaining means and internal support means disposed thereabove:

a generally cylindrical, open-ended, tubular cage retained by said internal support means within a cooking zone surrounded by said housing and bearing about its inner face successive axially spaced, interrupted circles of inward-directed arcuate supports, the supports which comprise each interrupted circle being circumferentially staggered relative to those of axially adjacent circles;

a generally annular, transversely disposed grill movable axially within the cylindrical cage and adapted to hold food for cooking at different support levels provided by said interrupted circles, said grill having a peripheral series of elements adapted selectively to engage said arcuate supports of such circles; and operative means for engaging and disengaging the respective arcuate supports and engaging elements, and for moving the grill from one support level to another within said cage.

5. A cooking assembly of the character described, comprising in combination:

an upstanding, generally tubular, closed-end housing having individually adjustable, external air passage means adjacent the top and bottom respectively for jointly regulating the flow of air through the length of the housing and by adjustment of which a substantial volume of recirculating heated air can be retained within said housing;

internal food support means associated with a generally transverse cooking zone which is thus located at an intermediate height within said housing;

an open-ended tubular cage upstanding from and surrounding said food support means and spaced peripherally inward from said housing to define a generally vertical air passage between the housing and cage;

a fuel-holding grate transversely disposed within said housing intermediate the food support means and the bottom air passage means, having its perimeter spaced from the housing to allow passage of air lengthwise along the inner wall of said housing, transverse to said grate, in open communication with said vertical air passage which surrounds said cage; and a dome-shaped cover forming the top of said housing and being internally shaped to focus radiant heat onto the transverse area of the cooking zone and to deflect centrally rising currents of heated air downwardly along the sides of said housing and adjacent the perimeter of said cage and grate in a repetitive cycle.

6. A cooking assembly of the character described, comprising in combination:

an upstanding, generally tubular, closed-end housing formed of internally glazed ceramic material and having individually adjustable, external air passage means adjacent the top and bottom respectively for jointly regulating the flow of air through the length of the housing and by adjustment of which a substantial column of recirculating heated air can be retained within said housing;

internal food support means associated with a generally transverse cooking zone which is thus located at an intermediate height within said housing;

an open-ended tubular cage upstanding from and surrounding said food support means and spaced peripherally inward from said housing to define a generally vertical air passage between the housing and cage;

a bowl-shaped fuel-holding grate transversely disposed within said housing intermediate the food support means and the bottom air passage means, having its perimeter spaced from the housing to allow passage of air lengthwise along the inner wall of said housing, transverse to said grate, in open communciation with said vertical air passage between the housing and cage; and a centrally apertured, generally hemispherical cover forming the top of said housing and having an internally glazed, dome-shaped surface shaped to focus radiant heat onto the transverse area of the cooking zone and to deflect centrally rising currents of heated air downwardly along the sides of said housing and adjacent the perimeter of said cage and grate in a repetitive cycle.

References Cited by the Examiner

UNITED STATES PATENTS

| | | | |
|---|---|---|---|
| 2,786,463 | 3/1957 | Vincent | 126—25 |
| 3,021,830 | 2/1962 | Witcher | 126—25 |
| 3,085,562 | 4/1963 | Persinger et al. | 126—25 |
| 3,145,289 | 8/1964 | Swetlitz | 126—39 |
| 3,193,663 | 7/1965 | Budzich et al. | 126—39 |

FREDERICK L. MATTESON, JR., *Primary Examiner.*

E. G. FAVORS, *Assistant Examiner.*